US012675249B2

(12) United States Patent
Zhang et al.

(10) Patent No.: US 12,675,249 B2
(45) Date of Patent: Jul. 7, 2026

(54) CONCURRENT FRAME BUFFER COMPOSITION SCHEME

(71) Applicant: QUALCOMM Incorporated, San Diego, CA (US)

(72) Inventors: Nan Zhang, Beijing (CN); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/855,272

(22) PCT Filed: May 23, 2022

(86) PCT No.: PCT/CN2022/094347
§ 371 (c)(1),
(2) Date: Oct. 8, 2024

(87) PCT Pub. No.: WO2023/225771
PCT Pub. Date: Nov. 30, 2023

(65) Prior Publication Data
US 2025/0231725 A1 Jul. 17, 2025

(51) Int. Cl.
G06F 3/14 (2006.01)
G06T 1/20 (2006.01)
G06T 1/60 (2006.01)
(52) U.S. Cl.
CPC .................. G06F 3/14 (2013.01); G06T 1/20 (2013.01); G06T 1/60 (2013.01)
(58) Field of Classification Search
CPC .... G06F 3/14; G06T 1/20; G06T 1/60; H04N 7/18
See application file for complete search history.

(56) References Cited

U.S. PATENT DOCUMENTS 10,643,296 B2 5/2020 Nguyen et al.
2007/0067739 A1* 3/2007 Atarashi ............ H04N 21/4312
715/818

(Continued)

FOREIGN PATENT DOCUMENTS

WO 2012035927 A1 3/2012
WO 2017123340 A1 7/2017
WO 2021213222 A1 10/2021

OTHER PUBLICATIONS

International Search Report and Written Opinion—PCT/CN2022/094347—ISA/CN—Jan. 4, 2023.

(Continued)

*Primary Examiner* — Sahlu Okebato
(74) *Attorney, Agent, or Firm* — Procopio, Cory, Hargreaves & Savitch LLP

(57) ABSTRACT

Aspects presented herein relate to methods and devices for display processing including an apparatus, e.g., a GPU or a DPU. The apparatus may configure a plurality of concurrent frame buffers for a display processing operation, where all of the plurality of concurrent frame buffers are associated with a same frame in a plurality of frames in a scene of the display processing operation. The apparatus may also obtain a set of display layers associated with the plurality of frames in the scene of the display processing operation. Further, the apparatus may identify a composition mapping scheme based on the plurality of concurrent frame buffers and the set of display layers. The apparatus may also perform a composition of one or more display layers in the set of display layers based on the composition mapping scheme.

28 Claims, 12 Drawing Sheets

(56) References Cited

U.S. PATENT DOCUMENTS

| 2007/0283175 | A1 * | 12/2007 | Marinkovic | .......... | G06F 1/3218 |
| | | | | | 713/320 |
| 2016/0307297 | A1 * | 10/2016 | Akenine-Moller | ..... | G06F 3/011 |
| 2017/0200252 | A1 * | 7/2017 | Nguyen | ................ | G06F 9/3871 |
| 2019/0349558 | A1 | 11/2019 | Modrzyk et al. | | |
| 2022/0068201 | A1 | 3/2022 | Yoon et al. | | |

OTHER PUBLICATIONS

Supplementary European Search Report EP22942984 Search Authority the Hague Oct. 16, 2025.

* cited by examiner

100

Figure 4:
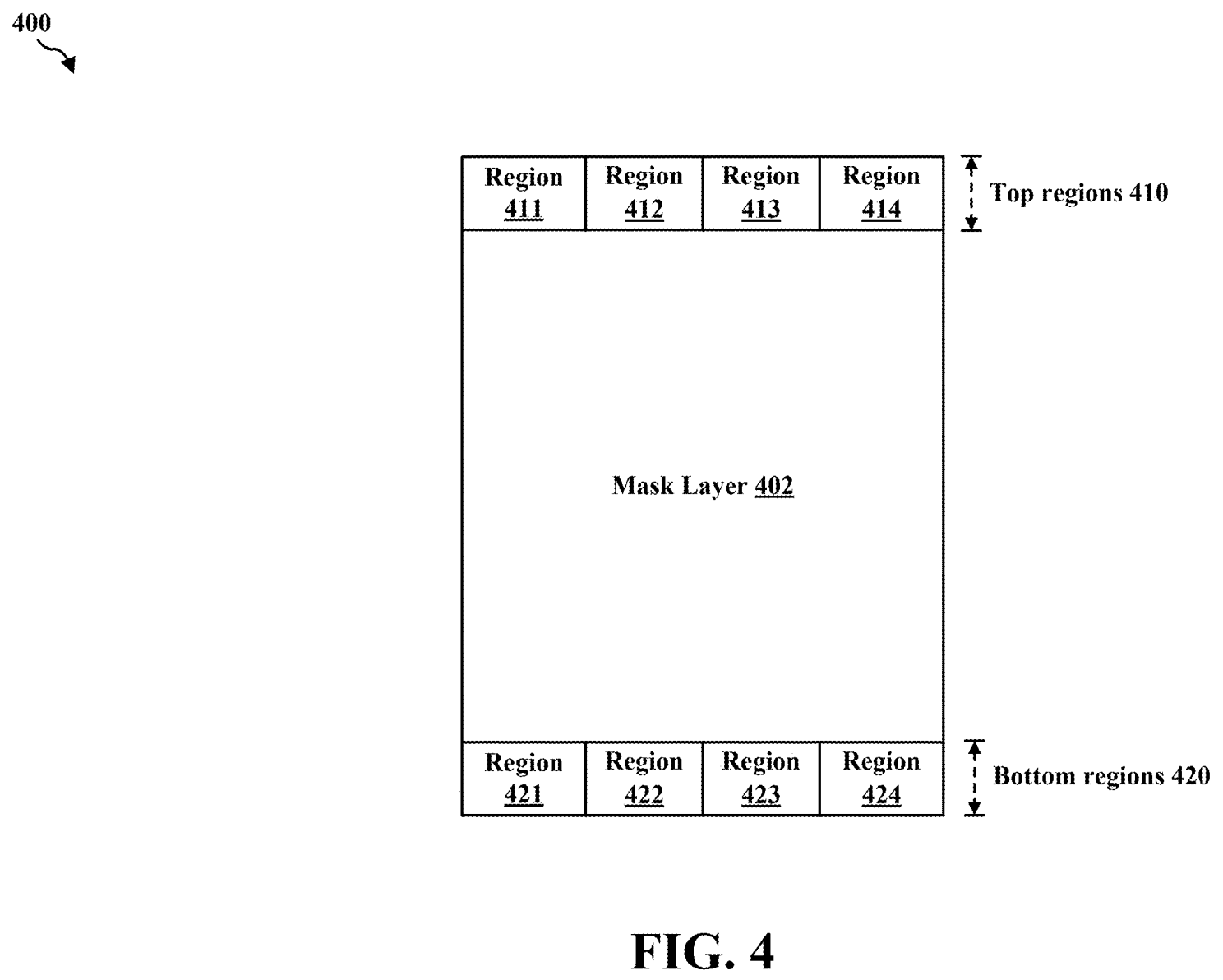

Top regions 410

Bottom regions 420

Region 411

Region 412

Region 413

Region 414

Mask Layer 402

Region 421

Region 422

Region 423

Region 424

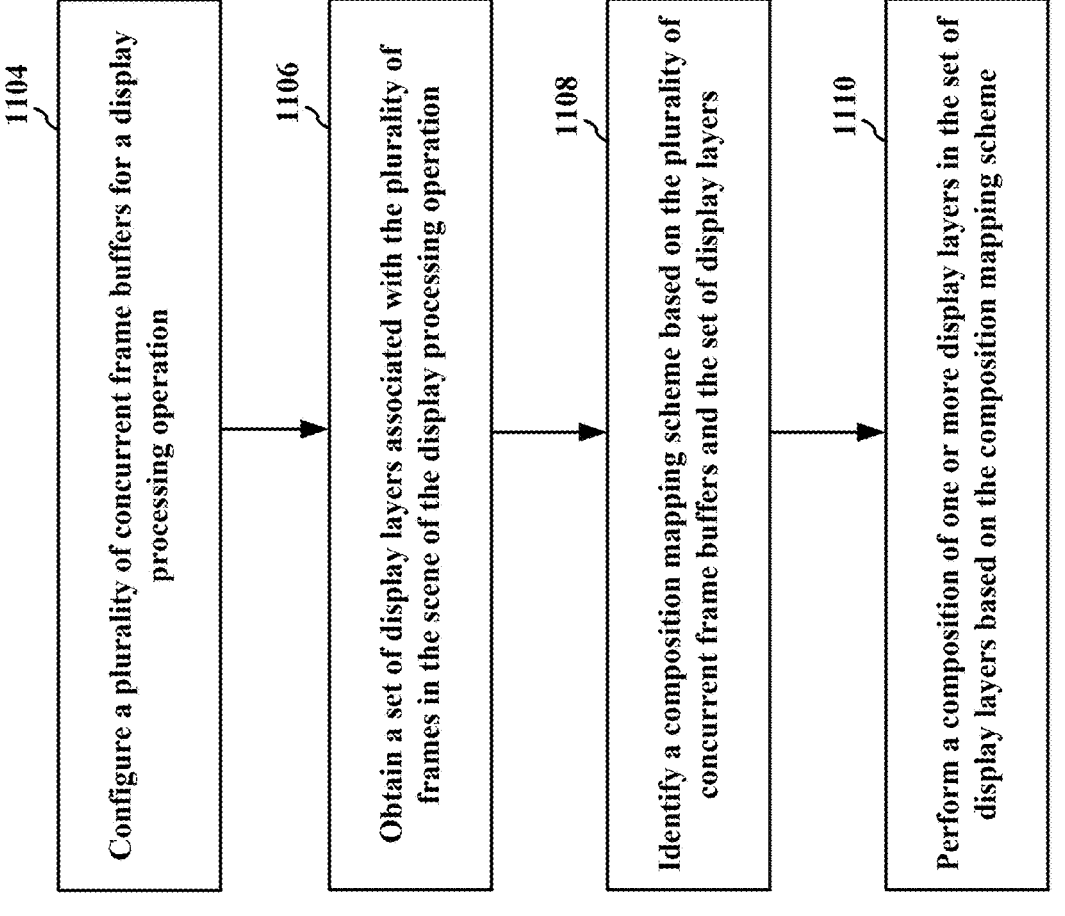

1104 Configure a plurality of concurrent frame buffers for a display processing operation 1106 Obtain a set of display layers associated with the plurality of frames in the scene of the display processing operation 1108 Identify a composition mapping scheme based on the plurality of concurrent frame buffers and the set of display layers 1110 Perform a composition of one or more display layers in the set of display layers based on the composition mapping scheme

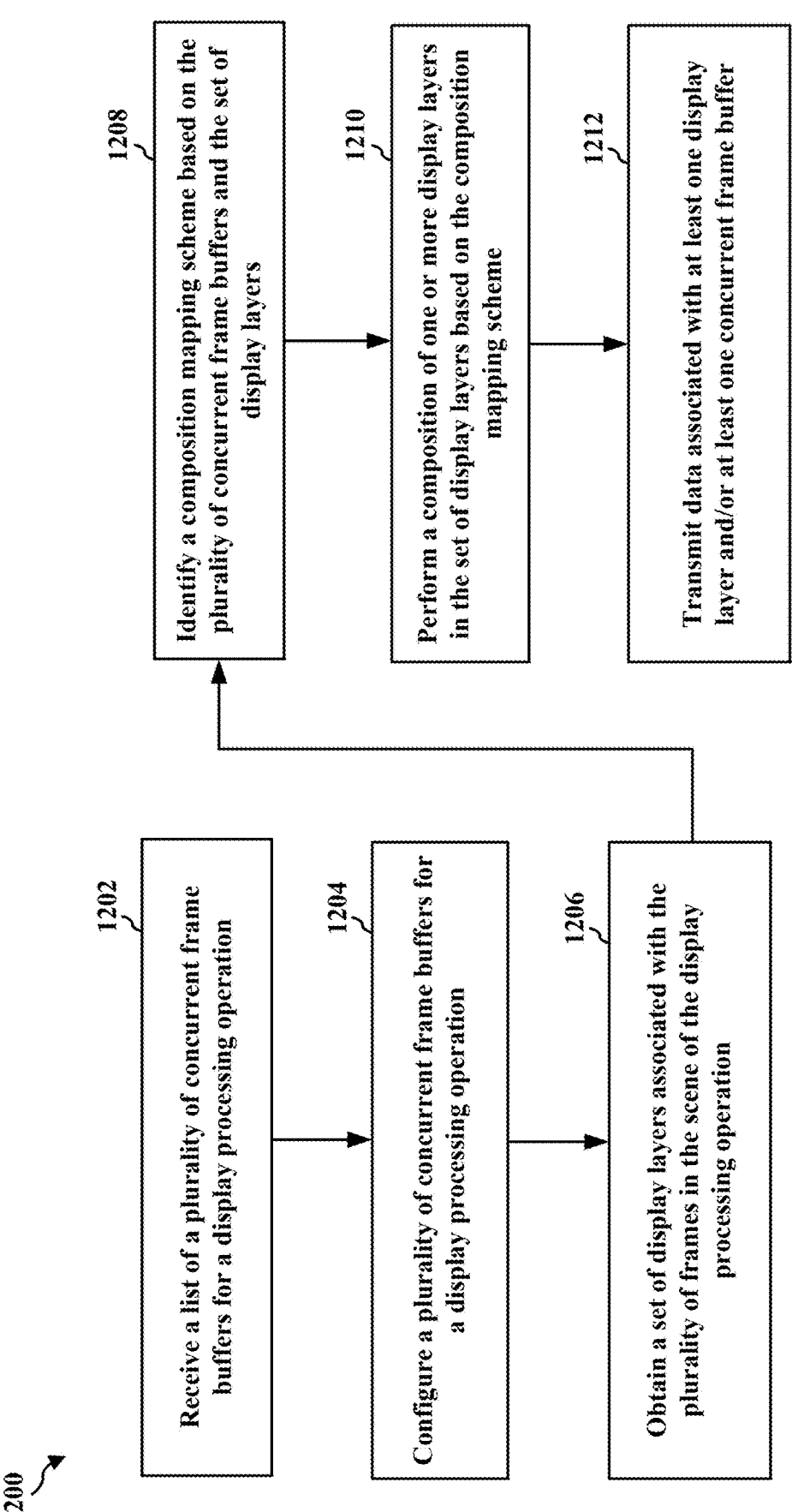

1200

1202 Receive a list of a plurality of concurrent frame buffers for a display processing operation 1204 Configure a plurality of concurrent frame buffers for a display processing operation 1206 Obtain a set of display layers associated with the plurality of frames in the scene of the display processing operation 1208 Identify a composition mapping scheme based on the plurality of concurrent frame buffers and the set of display layers 1210 Perform a composition of one or more display layers in the set of display layers based on the composition mapping scheme 1212 Transmit data associated with at least one display layer and/or at least one concurrent frame buffer

FIG. 12

CONCURRENT FRAME BUFFER COMPOSITION SCHEME

CROSS REFERENCE TO RELATED APPLICATION(S)

This application is a National Stage Application filed under 35 U.S.C. § 371 of PCT International Application No. PCT/CN2022/094347, entitled "CONCURRENT FRAME BUFFER COMPOSITION SCHEME" and filed May 23, 2022, which is expressly incorporated by reference herein in its entirety.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU), a display processing unit (DPU), or any apparatus that may perform display processing. The apparatus may receive a list of a plurality of concurrent frame buffers for a display processing operation. The apparatus may also configure a plurality of concurrent frame buffers for a display processing operation, where all of the plurality of concurrent frame buffers are associated with a same frame in a plurality of frames in a scene of the display processing operation. Additionally, the apparatus may obtain a set of display layers associated with the plurality of frames in the scene of the display processing operation. The apparatus may also identify a composition mapping scheme based on the plurality of concurrent frame buffers and the set of display layers. Moreover, the apparatus may perform a composition of one or more display layers in the set of display layers based on the composition mapping scheme. The apparatus may also transmit, based on the composition of the one or more display layers, data associated with one or more of: at least one display layer in the set of display layers or at least one concurrent frame buffer in the plurality of concurrent frame buffers.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4 is a diagram illustrating an example mask layer for display processing.

FIG. 5 is a diagram illustrating an example layer composition scheme for display processing.

FIG. 11 is a flowchart of an example method of display processing.

FIG. 12 is a flowchart of an example method of display processing.

DETAILED DESCRIPTION

Figure 1:
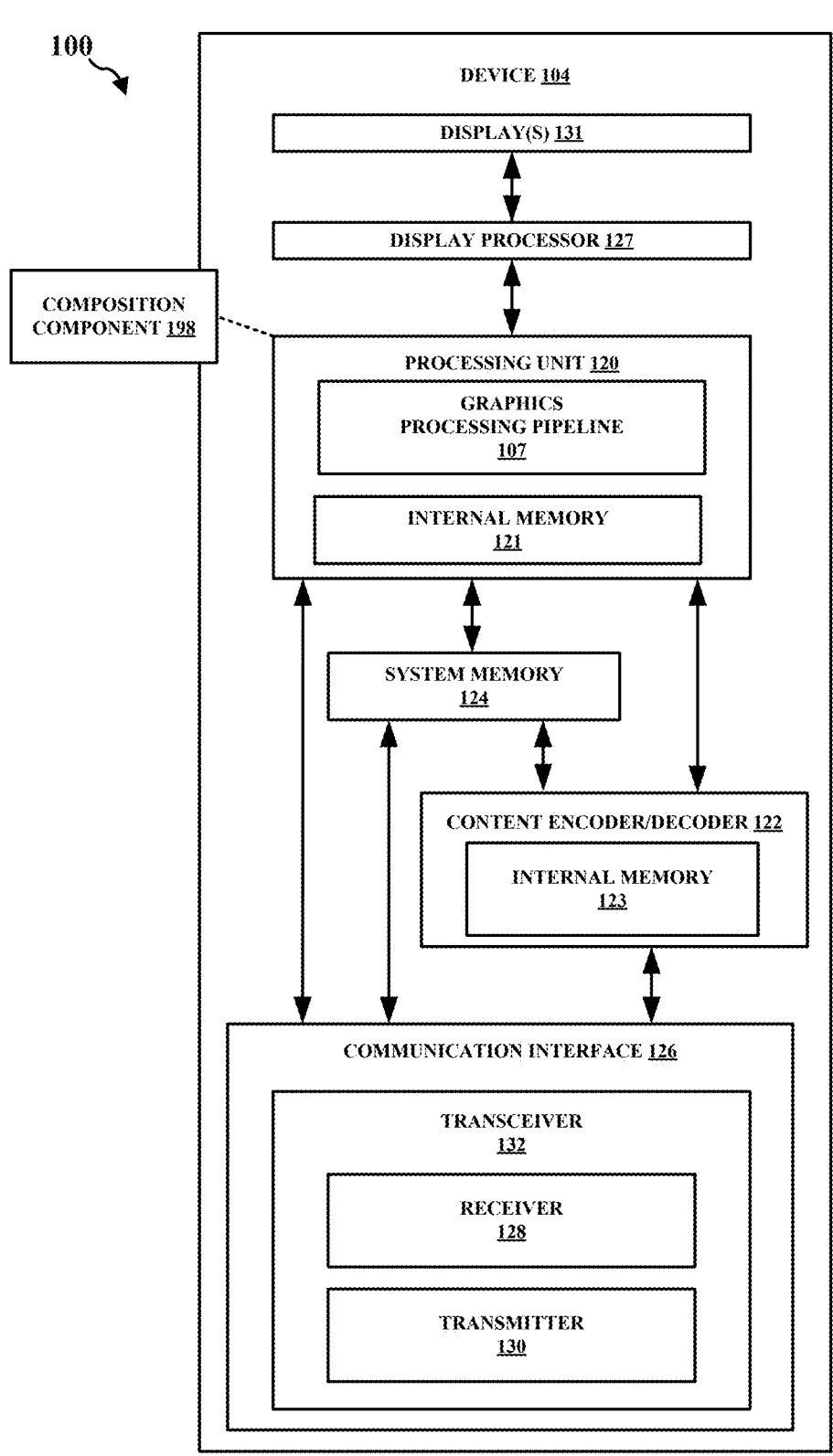
FIG. 1 is a block diagram that illustrates an example content generation system.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers. In some aspects, certain types of frame buffers may correspond to a reduced display quality (e.g., poor composition performance, poor power performance, poor color management, and/or poor visual quality). For instance, certain types of frame buffer composition may not be able to match certain power/performance specifications of certain displays (e.g., a high frame rate, high layer complexity, frame geometry, standard dynamic range (SDR)/high dynamic range (HDR)), such as color management and mobile system performance/ power specifications of certain displays. Some types of layer formats may lose details (e.g., color and geometry details) for certain types of composition. For example, if 4 bytes are maintained and a 32-bit buffer alignment is not changed, the alpha channel may not be sufficient to maintain a certain level of detail. Additionally, if a direct change is made to the frame buffer, the power/performance cost may be high. In some aspects, if the frame buffer is tagged as SDR, it may fail to meet an HDR layer composition specification. Also, if the frame buffer is tagged as HDR, it may fail to meet an SDR layer composition specification, as well as result in poor power/performance. As indicated herein, frame buffers that process a certain type of layer format may not be able to fully process all of the layers in a composition. This may result in an insufficient layer composition allocation, as well as result in certain layers that are not composed. Aspects of the present disclosure may utilize frame buffers that may be able to process all types of layer formats. For instance, aspects of the present disclosure may utilize a number of different types of frame buffers when performing a layer composition allocation. For example, aspects of the present disclosure may cache or store different types of layers at a number of different types of frame buffers. Additionally, in some instances, aspects of the present disclosure may utilize a composition mapping scheme in order to map different layers to different frame buffers during a composition process. That is, aspects presented herein may provide a composition mapping scheme for caching or storing different types of layers at a number of different types of frame buffers.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a composition component 198 configured to receive a list of a plurality of concurrent frame buffers for a display processing operation. The composition component 198 may also be configured to configure a plurality of concurrent frame buffers for a display processing operation, where all of the plurality of concurrent frame buffers are associated with a same frame in a plurality of frames in a scene of the display processing operation. The composition component 198 may also be configured to obtain a set of display layers associated with the plurality of frames in the scene of the display processing operation. The composition component 198 may also be configured to identify a composition mapping scheme based on the plurality of concurrent frame buffers and the set of display layers. The composition component 198 may also be configured to perform a composition of one or more display layers in the set of display layers based on the composition mapping scheme. The composition component 198 may also be configured to transmit, based on the composition of the one or more display layers, data associated with one or more of: at least one display layer in the set of display layers or at least one concurrent frame buffer in the plurality of concurrent frame buffers. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
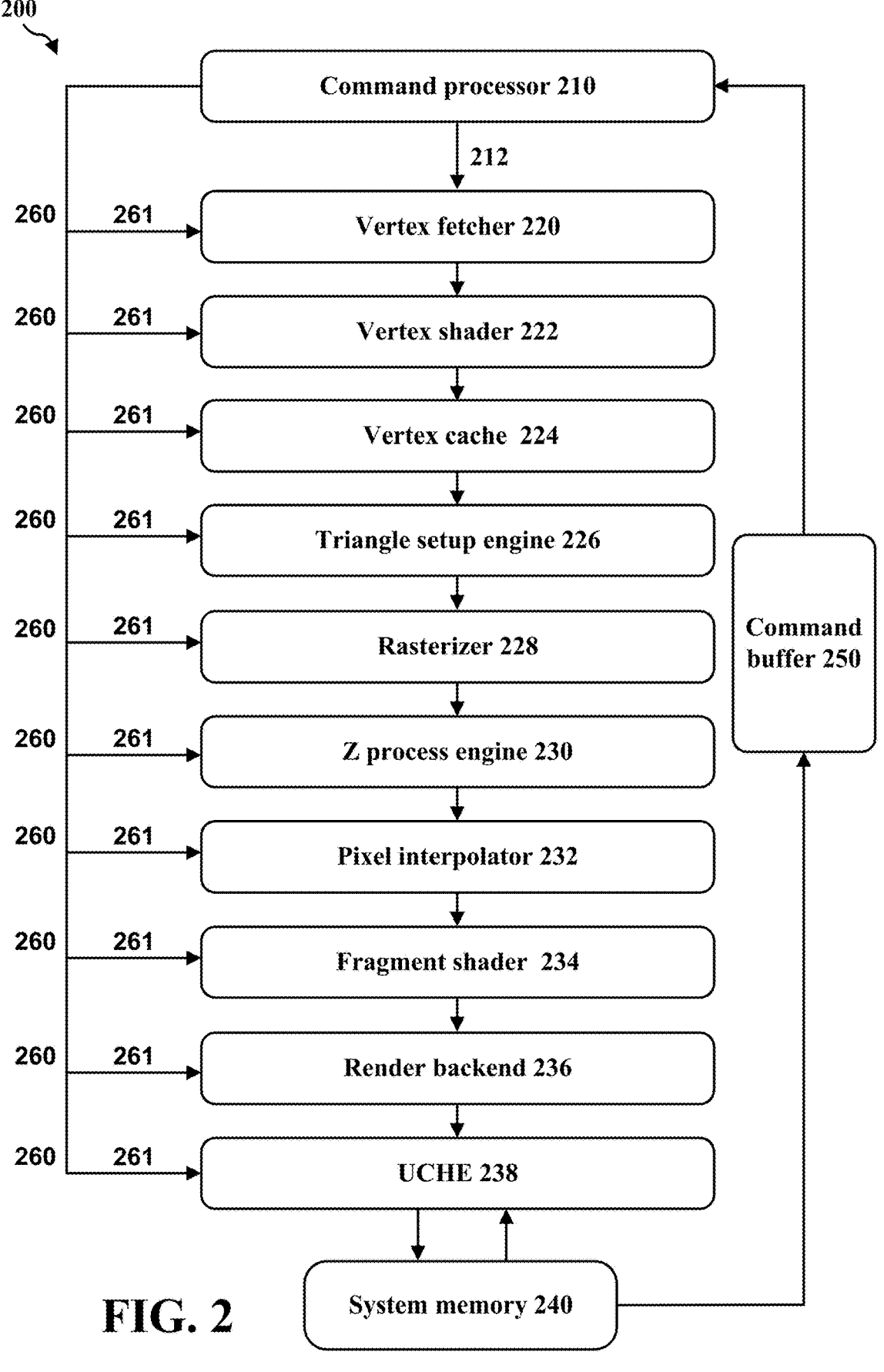
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
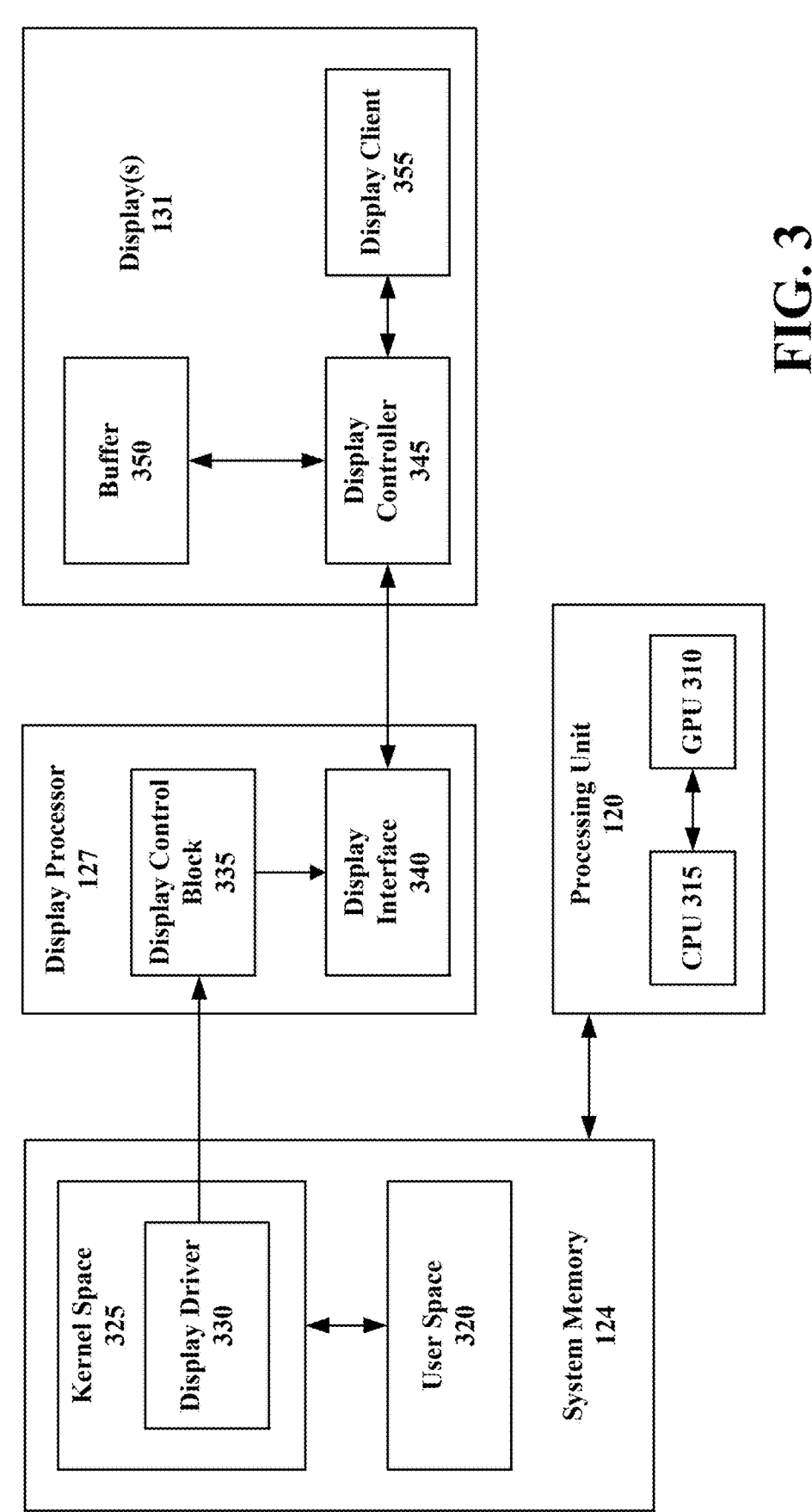
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize frame buffers to cache or store a composition output of a GPU. For instance, display layers may be cached or stored in a frame buffer after composition at a GPU. In some aspects, a composition hardware (HW) or software (SW) stack may use a frame buffer target to cache a composition output (e.g., a GPU composition output or a CPU composition output). The cached composition output may then be sent to another processor (e.g., a DPU) as an input layer. The frame buffer may have a number of different color formats, such as a red (R) green (G) blue (B) alpha (A) (RGBA) format (e.g., RGBA8888 format). Also, the frame buffer may be a certain size, (e.g., a 32-bit triple buffer). For example, at the beginning of a display/graphics subsystem design, a frame buffer may be created as an RGBA8888 format and a 32-bit triple buffer. In some instances, if the frame layers do not use a certain composition (e.g., a GPU or client composition), the frame buffers may be ignored. Also, the layers (e.g., frame layers or display layers associated with display processing) may be directly fetched and composed. For instance, a DPU or hardware composer may directly fetch the layers and then compose the layers.

Figure 5:
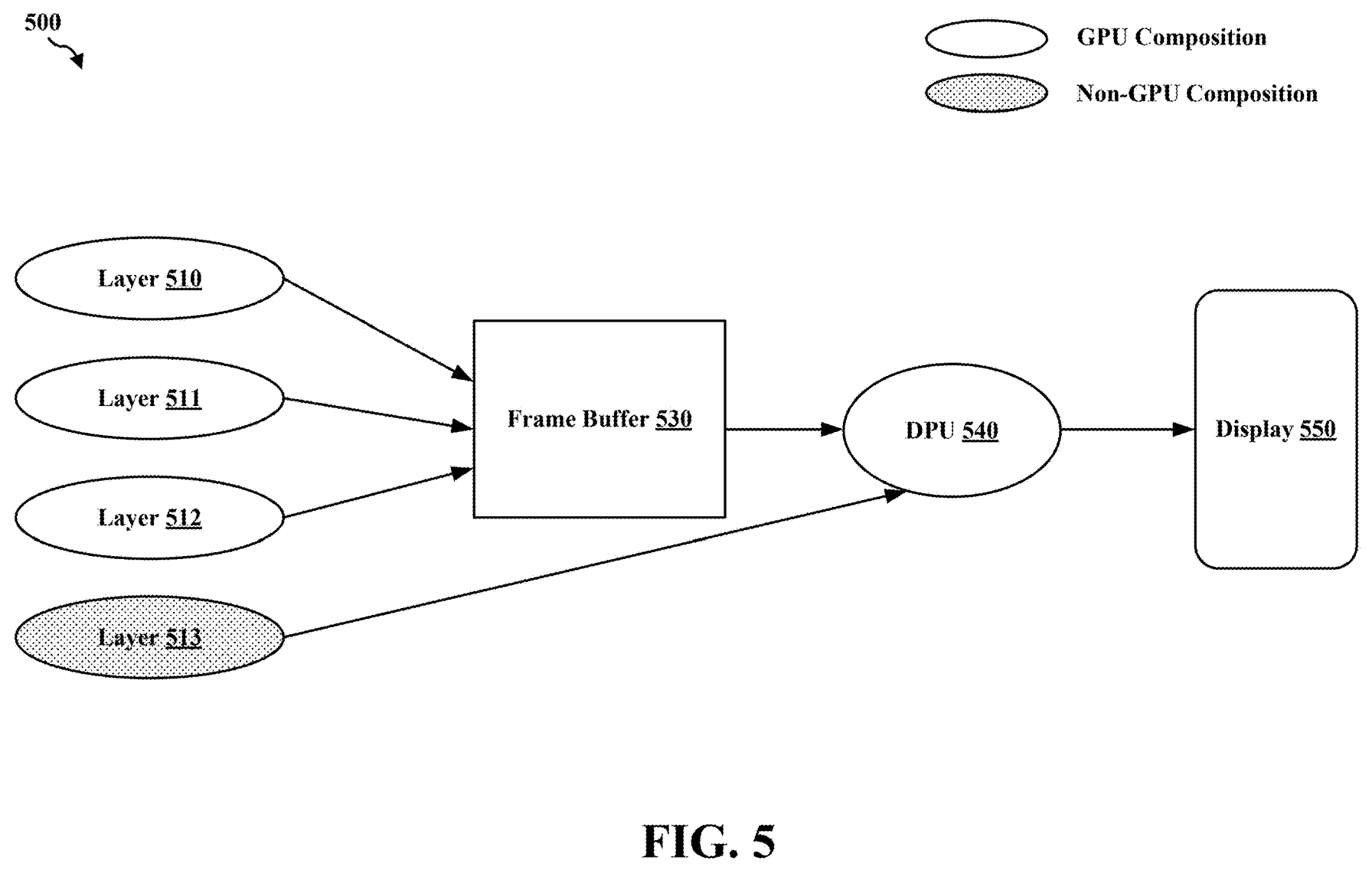

FIG. 5 is a diagram 500 illustrating an example of a layer composition scheme for display processing. More specifically, diagram 500 depicts a layer composition of display layers where certain layers (e.g., layers of a certain composition) are cached in a frame buffer, and some layers are directly fetched and composed by a DPU. As shown in FIG. 5, diagram 500 includes layer 510, layer 511, layer 512, layer 513, frame buffer 530 (e.g., an RGBA8888 format frame buffer), DPU 540, and display 550. FIG. 5 depicts that layers composed at a GPU (i.e., layers associated with GPU composition) may be cached or stored in a frame buffer. For example, layer 510, layer 511, and layer 512 may be composed at a GPU and then cached/stored at frame buffer 530. Alternatively, layers that are not composed at a GPU (i.e., layers associated with non-GPU composition) may be directly fetched and composed at a DPU. For instance, layer 513 may be directly fetched and composed at DPU 540. That is, layer 510, layer 511, and layer 512 may be a certain type of composition (e.g., GPU composition), while layer 513 may be another type of composition (non-GPU composition). After being cached/stored in frame buffer 530, the layer 510, layer 511, and layer 512 may be sent to DPU 540. Further, after processing at DPU 540, the layers 510-513 may be sent to display 550.

In some aspects, certain types of frame buffers (e.g., a single format 32-bit RGBA8888 frame buffer) may correspond to a reduced display quality (e.g., poor composition performance, poor power performance, poor color management, and/or poor visual quality). For instance, certain types of frame buffer composition (e.g., a single format 32-bit RGBA8888 frame buffer composition) may not be able to match certain power/performance specifications of certain displays (e.g., a high frame rate, high layer complexity, frame geometry, standard dynamic range (SDR)/high dynamic range (HDR)), such as color management and mobile system performance/power specifications of certain displays. Some types of layer formats (e.g., a floating-point 16-bit (FP16) format, an integer 12-bit (INT12) format, an integer 10-bit (INT10) format) may lose details (e.g., color and geometry details) for certain types of composition (e.g., a 32-bit RGBA8888 GPU composition). For example, if 4 bytes are maintained and a 32-bit buffer alignment is not changed (e.g., an RGBA1010102 buffer), the alpha channel (e.g., a 2-bit alpha channel) may not be sufficient to maintain a certain level of detail. Additionally, if a direct change is made to the frame buffer (e.g., a change to an RGBA FP16161616 8-byte format), the power/performance cost may be high. In some aspects, if the frame buffer is tagged as SDR, it may fail to meet an HDR layer composition specification. Also, if the frame buffer is tagged as HDR, it may fail to meet an SDR layer composition specification, as well as result in poor power/performance.

Figure 6:
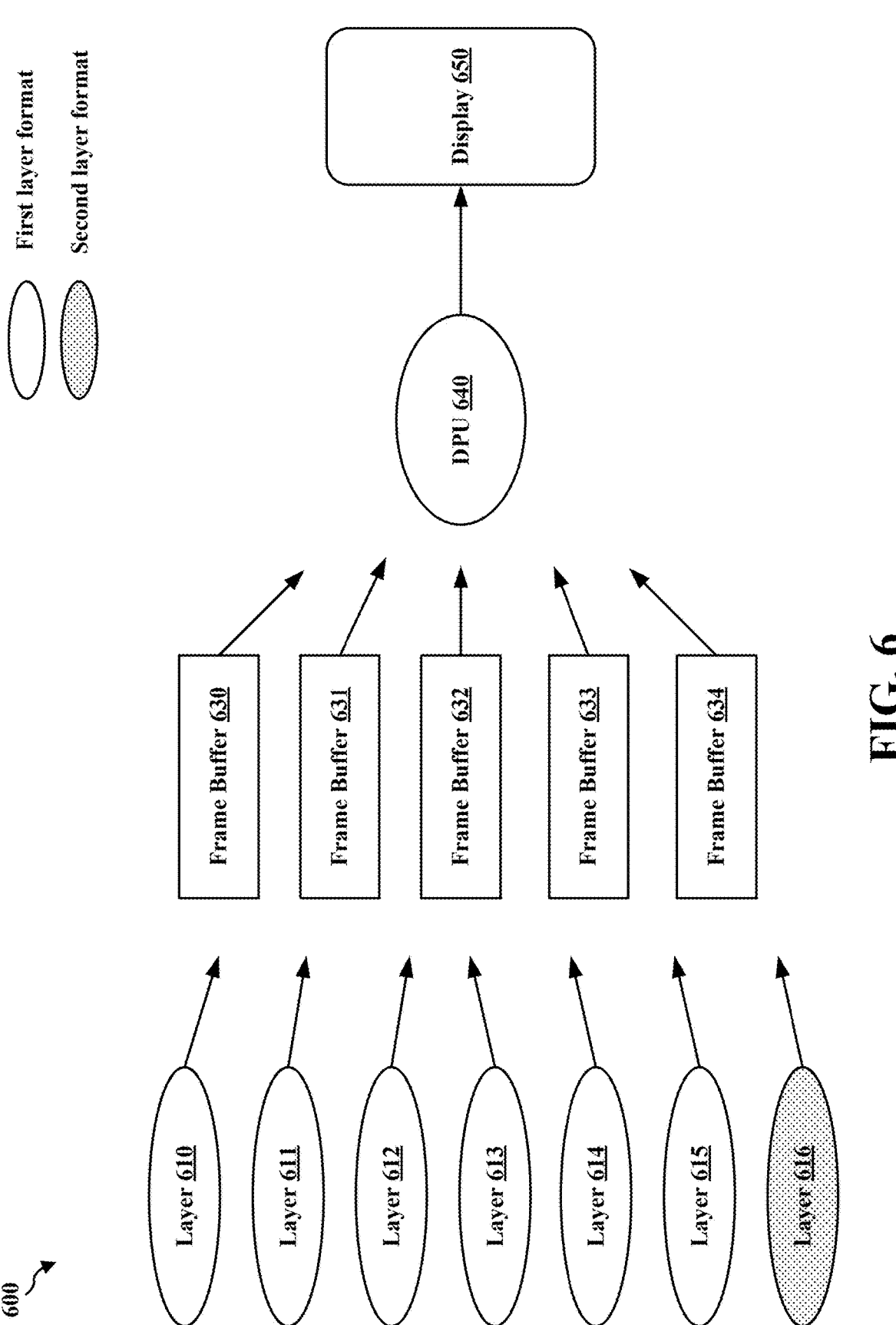
FIG. 6 is a diagram illustrating an example layer composition scheme for display processing.

FIG. 6 is a diagram 600 illustrating an example of a layer composition scheme for display processing. More specifically, diagram 600 depicts a layer composition of certain types of display layers (e.g., layers of a certain composition) and other types of display layers (e.g., layer of another composition). As shown in FIG. 6, diagram 600 includes a number of layers, such as layer 610 (e.g., a 10-bit luminance (Y) chrominance (UV) (YUV) HDR format), layer 611 (e.g., a 10-bit RGB protocol 3 (P3) format), layer 612 (e.g., a 10-bit RGB P3 format), layer 613 (e.g., a 10-bit RGB HDR format), layer 614 (e.g., an FP16 RGB P3 format), layer 615 (e.g., an 8-bit standard RGB (sRGB) format), and layer 616 (e.g., an FP16 RGB HDR format). Diagram 600 also includes a number of frame buffers, such as frame buffer 630 (e.g., an RGBA8888 format frame buffer), frame buffer 631 (e.g., an RGBA16161616 format frame buffer), frame buffer 632 (e.g., an RGBA1010102 format frame buffer), frame buffer 633 (e.g., an SDR format frame buffer), and frame buffer 634 (e.g., an HDR format frame buffer). Further, diagram 600 in FIG. 6 includes DPU 640 and display 650 (e.g., a 10-bit 1440×3200, 120 Hz, 1800 Nit, HDR, organic light emitting diode (OLED) display). FIG. 6 depicts that some frame buffers (e.g., frame buffers 630-634) may be sufficient for certain types of layer formats (e.g., a first layer format of layers 610-615), but insufficient for other types of layer formats (e.g., a second layer format of layer 616). As such, the frame buffers may not be able to process all of the layers in the display processing, so the layer composition may not sufficiently allocate all of the layers to the frame buffers. That is, the frame buffers 630-634 may not be able to process layer 616, so the layer composition may not fully allocate all of the layers 610-616 to the frame buffers 630-634.

As indicated herein, frame buffers that process a certain type of layer format may not be able to fully process all of the layers in a composition. This may result in an insufficient layer composition allocation, as well as result in certain layers that are not composed. Based on the above, it may be beneficial to utilize frame buffers that may be able to process all types of layer formats. For instance, it may be beneficial to utilize a number of different types of frame buffers when performing layer composition allocation. For example, it may be beneficial to cache or store different types of layers at a number of different types of frame buffers.

Aspects of the present disclosure may utilize frame buffers that may be able to process all types of layer formats. For instance, aspects of the present disclosure may utilize a number of different types of frame buffers when performing a layer composition allocation. For example, aspects of the present disclosure may cache or store different types of layers at a number of different types of frame buffers. Additionally, in some instances, aspects of the present disclosure may utilize a composition mapping scheme in order to map different layers to different frame buffers during a composition process. That is, aspects presented herein may provide a composition mapping scheme for caching or storing different types of layers at a number of different types of frame buffers.

In some instances, aspects of the present disclosure may utilize a dynamic composition strategy including concurrent frame buffers (e.g., frame buffers that cache or store information concurrently) with individual formats and/or individual color spaces/ranges. For instance, aspects presented herein may create several frame buffers (e.g., double or triple buffers) or frame buffer targets (FBTs) with different formats/color spaces/ranges. For example, the frame buffers or FBTs may be created during an initiation or run-time of an operating system (OS). For each display in multiple display devices, the frame buffers or FBTs may be created separately. Further, the different formats of frame buffers or FBTs may share a physical memory buffer, if applicable (e.g., based on device-specific random access memory (RAM) capabilities). Additionally, in some instances, aspects presented herein may dynamically create new frame buffers or FBTs during the OS run-time if the frame buffers or FBTs are not created during booting. Some types of frame buffers or FBTs may be configured or created during an initiation or run-time of the OS. For example, an RGBA8888 display P3/sRGB, triple buffer format frame buffer may be configured or created during an initiation or run-time of the OS. Also, an RGBA12121212 display P3/sRGB, triple buffer format frame buffer may be configured or created during an initiation or run-time of the OS. Further, an RGBA16161616 FP16/HDR, double buffer may be configured or created during an initiation or run-time of the OS in order to save memory.

In some aspects, e.g., during a run-time of an OS, aspects presented herein may dynamically determine a composition mapping scheme for layers and frame buffers/FBTs. The composition mapping scheme (including multiple frame buffers/FBTs) may be divided into several categories. Aspects presented herein may select a best or most suitable frame buffer/FBT from a list of frame buffers/FBTs, and then use the best or most suitable frame buffer/FBT to cache a GPU composition output (e.g., if GPU composition is involved). The composition mapping strategy or selected frame buffer/FBT may be based on a number of different categories (e.g., RGB bits for each layer, color space, HDR or SDR, and/or DPU hardware specifications). For instance, if a certain format is selected (e.g., an RGBA16161616 FP16 format), a DPU may compose the frame buffer/FBT together with other layers, or the frame buffer/FBT may be the sole DPU input. Additionally, aspects presented herein may select two or more frame buffers/FBTs, and these frame buffers/FBTs (e.g., if GPU composition is involved) may be used for the same frame composition based on a number of different categories (e.g., RGB bits for each layer, color space, HDR or SDR, and/or DPU hardware specifications). For instance, if a certain format is selected (e.g., an RGBA8888 display P3/sRGB format or an RGBA16161616 FP16 format), the DPU may compose those two concurrent frame buffers/FBTs and other layers. Moreover, aspects presented herein may select one frame buffer/FBT for each window display (e.g., in a split screen display format). For instance, aspects presented herein may select a first format (e.g., an RGBA8888 display P3/sRGB format) for a first display and select a second format (e.g., an RGBA12121212 display P3/sRGB format) for a second display.

Additionally, in some aspects, a compositor (e.g., an OS service compositor) may negotiate a composition mapping scheme (i.e., a frame buffer/FBT selection strategy) with a GPU or a DPU through an application program interface (API) (e.g., a hardware composer API). The compositor may send available frame buffer/FBT lists together with layer lists to a GPU or a DPU. The GPU or DPU may then determine a final composition mapping scheme or frame buffer/FBT strategy. For example, the GPU or DPU may determine or identify which frame buffer/FBT will be used for a current frame composition. Also, the GPU or DPU may determine or identify layer lists to be composed for each specific frame buffer/FBT selection. Further, aspects presented herein may determine or identify a final pipe allocation strategy for content layers and frame buffers/FBTs.

Figure 7:
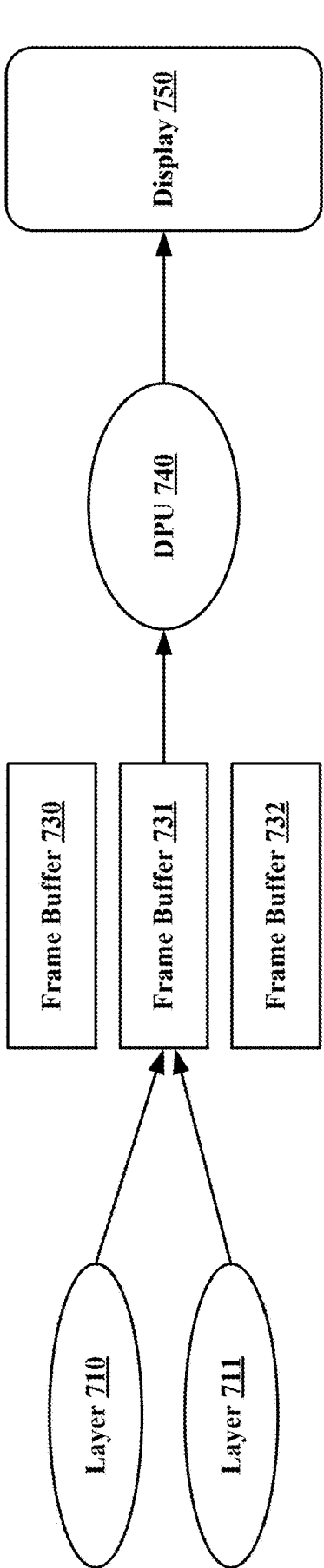
FIG. 7 is a diagram illustrating an example layer composition scheme for display processing.

FIG. 7 is a diagram 700 illustrating an example of a layer composition scheme for display processing. More specifically, diagram 700 depicts a composition of certain display layers (e.g., layers of a certain composition) at a frame buffer/FBT. As shown in FIG. 7, diagram 700 includes layer 710 (e.g., a 10-bit luminance (Y) chrominance (UV) (YUV) HDR format) and layer 711 (e.g., an 8-bit RGB P3 format). Diagram 700 also includes frame buffer 730 (e.g., an RGBA8888 format frame buffer), frame buffer 731 (e.g., an RGBA12121212 format frame buffer), and frame buffer 732 (e.g., an RGBA16161616 FP16 format frame buffer). Further, diagram 700 in FIG. 7 includes DPU 740 and display 750 (e.g., a 10-bit 1440×3200, 120 Hz, 1800 Nit, HDR OLED display). FIG. 7 depicts that layer 710 and layer 711 may be allocated to frame buffer 731. For instance, the composition of layer 710 and layer 711 may be cached or stored at frame buffer 731. FIG. 7 shows one type of composition mapping scheme for allocating the composition of one or more layers at a single frame buffer or a single FBT.

Figure 8:
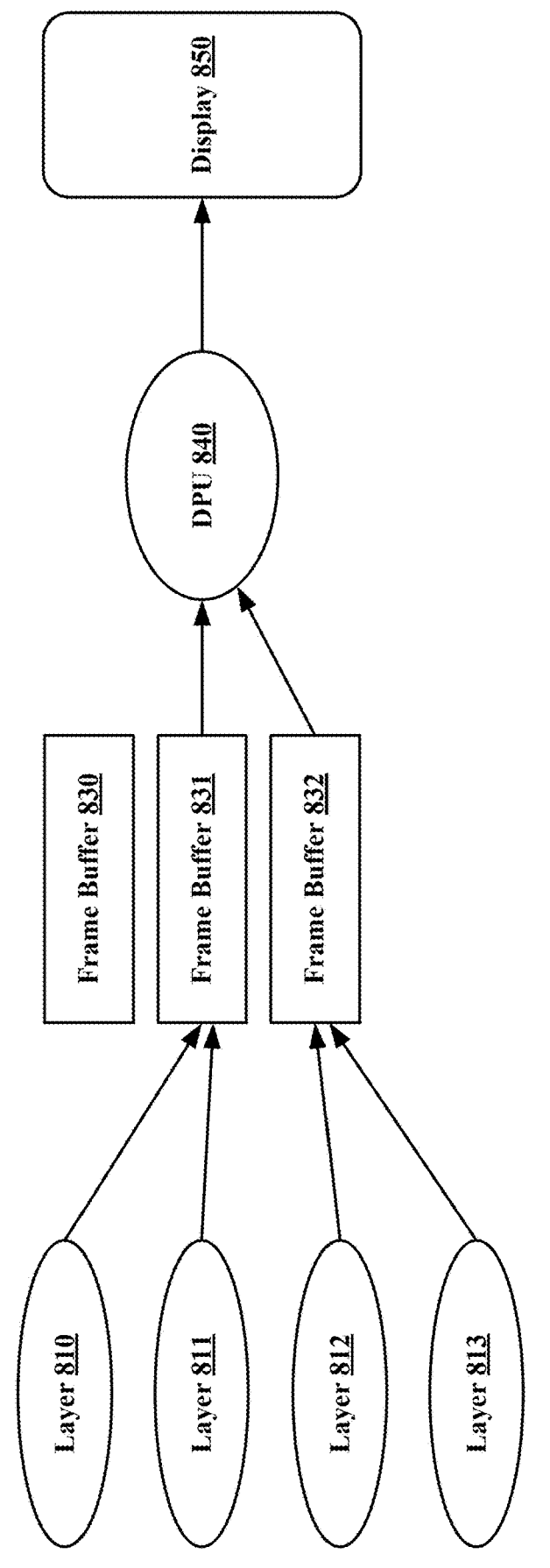
FIG. 8 is a diagram illustrating an example layer composition scheme for display processing.

FIG. 8 is a diagram 800 illustrating an example of a layer composition scheme for display processing. More specifically, diagram 800 depicts a composition of certain display layers (e.g., layers of a certain composition) at different frame buffers/FBTs. As shown in FIG. 8, diagram 800 includes layer 810 (e.g., a 10-bit YUV HDR format), layer 811 (e.g., an FP16 RGB format), layer 812 (e.g., an 8-bit RGB P3 animation format), and layer 813 (e.g., an 8-bit RGB P3 format). Diagram 800 also includes frame buffer 830 (e.g., an RGBA12121212 format frame buffer), frame buffer 831 (e.g., an RGBA16161616 FP16 format frame buffer), and frame buffer 832 (e.g., an RGBA8888 format frame buffer). Further, diagram 800 in FIG. 8 includes DPU 840 and display 850 (e.g., a 10-bit 1440×3200, 120 Hz, 1800 Nit, HDR OLED display). FIG. 8 depicts that layer 810 and layer 811 may be allocated to frame buffer 831. For instance, the composition of layer 810 and layer 811 may be cached or stored at frame buffer 831. Further, layer 812 and layer 813 may be allocated to frame buffer 832. That is, the composition of layer 812 and layer 813 may be cached or stored at frame buffer 832. FIG. 8 shows one type of composition mapping scheme for allocating the composition of multiple layers to multiple frame buffers or FBTs.

Figure 9:
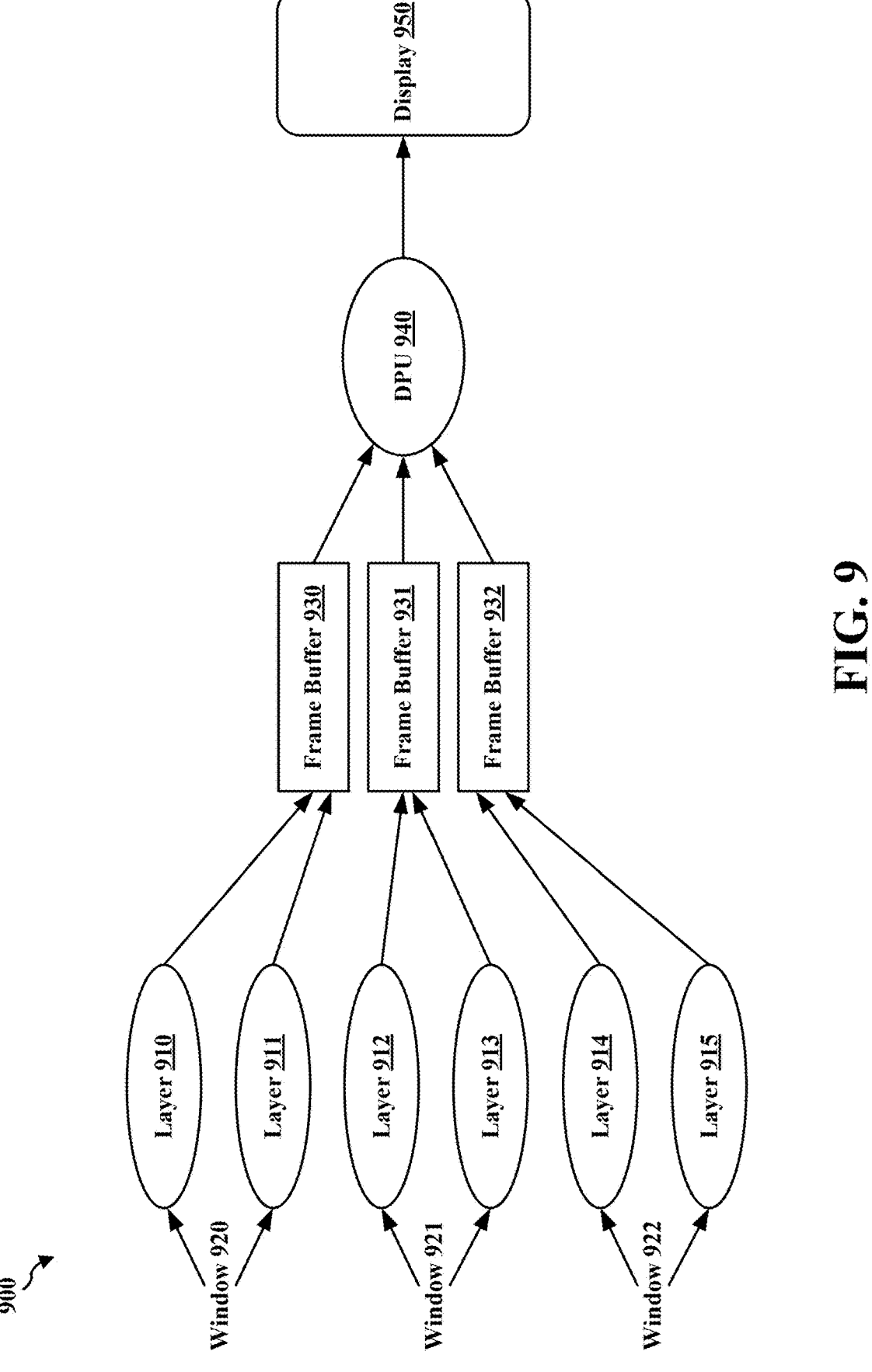
FIG. 9 is a diagram illustrating an example layer composition scheme for display processing.

FIG. 9 is a diagram 900 illustrating an example of a layer composition scheme for display processing. More specifically, diagram 900 depicts a composition of certain display layers (e.g., layers of a certain composition) that correspond to different windows (e.g., windows in a split screen display format) at different frame buffers/FBTs. As shown in FIG. 9, diagram 900 includes layer 910 (e.g., a 10-bit RGB HDR format), layer 911 (e.g., an 8-bit RGB animation format), layer 912 (e.g., an 8-bit RGB with blur effects format), layer 913 (e.g., an 8-bit RGB animation format), layer 914 (e.g., a 10-bit YUV HDR format), and layer 915 (e.g., an FP16 animation format). FIG. 9 shows that layer 910 and layer 911 correspond to window 920 (e.g., a window in a split screen display format), layer 912 and layer 913 correspond to window 921 (e.g., a window in a split screen display format), and layer 914 and layer 915 correspond to window 922 (e.g., a window in a split screen display format). Diagram 900 also includes frame buffer 930 (e.g., an RGBA12121212 format frame buffer), frame buffer 931 (e.g., an RGBA8888 format frame buffer), and frame buffer 932 (e.g., an RGBA16161616 FP16 format frame buffer). Further, diagram 900 in FIG. 9 includes DPU 940 and display 950 (e.g., a 10-bit 1440×3200, 120 Hz, 1800 Nit, HDR OLED display). FIG. 9 depicts that layer 910 and layer 911 (corresponding to window 920) may be allocated to frame buffer 930. For instance, the composition of layer 910 and layer 911 may be cached or stored at frame buffer 930. Also, layer 912 and layer 913 (corresponding to window 921) may be allocated to frame buffer 931. That is, the composition of layer 912 and layer 913 may be cached or stored at frame buffer 931. Further, layer 914 and layer 915 (corresponding to window 922) may be allocated to frame buffer 932 (i.e., the composition of layer 914 and layer 915 may be cached or stored at frame buffer 932). FIG. 9 shows one type of composition mapping scheme for allocating the composition of multiple layers (that correspond to different windows) to multiple frame buffers or FBTs.

Aspects of the present disclosure may include a number of benefits or advantages. For instance, aspects presented herein may reduce or optimize the amount of memory utilized for layer composition allocation. This reduced amount of memory may be suitable for current mobile devices. For example, aspects presented herein may reduce an amount of memory storage for layer composition allocation by 20 MB or 100 MB. Also, the layer composition allocation may improve a related power, performance, and/ or visual quality at a processing unit (e.g., a processing unit for a mobile device). Further, aspects presented herein may improve the composition power, performance, and/or visual quality at a GPU or a DPU. That is, aspects presented herein may balance the composition power, performance, and visual quality at a GPU or a DPU with the flexibility to select a best or most suitable frame buffer/FBT among multiple candidates of frame buffers/FBTs.

Figure 10:
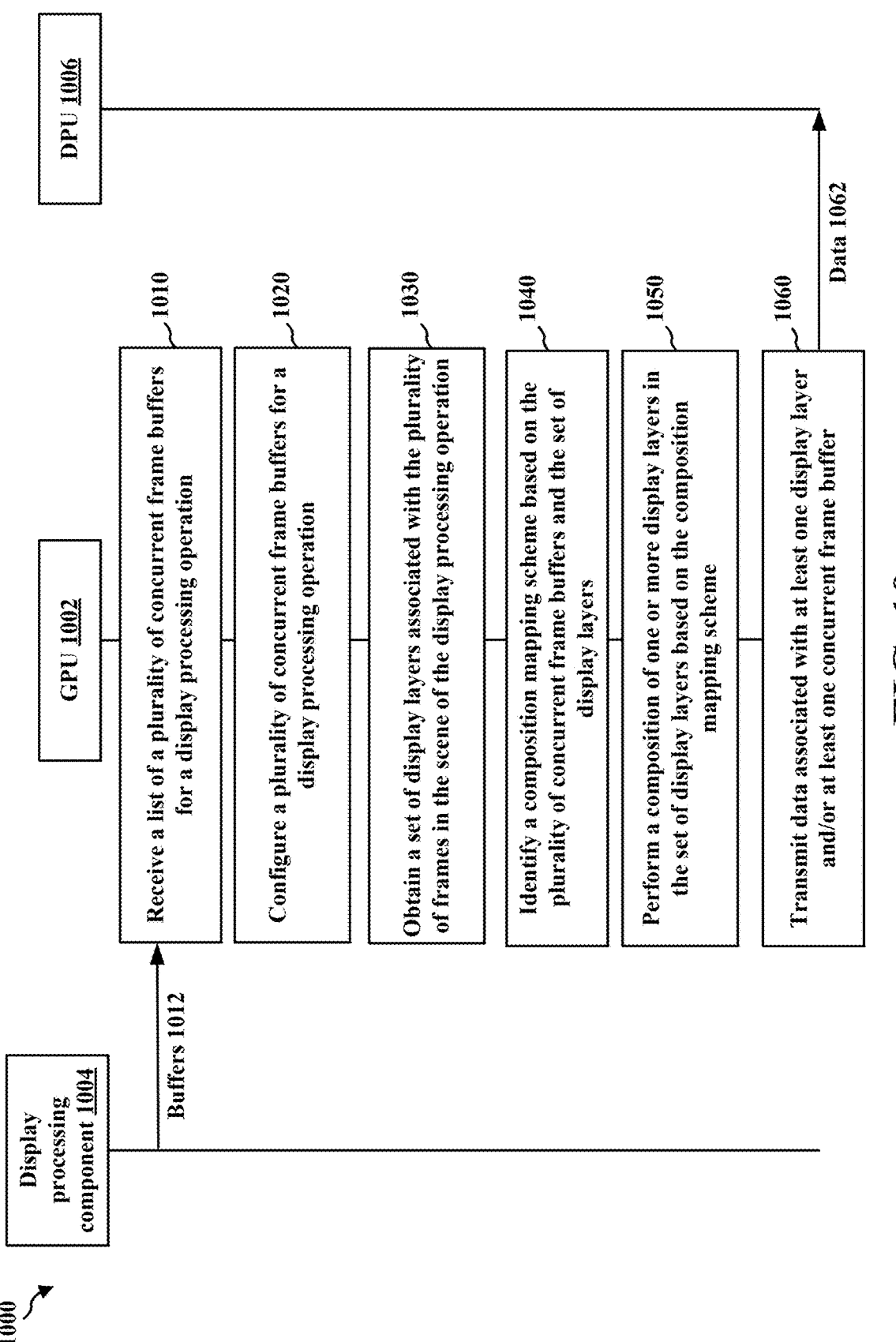
FIG. 10 is a communication flow diagram illustrating example communications between a GPU, a display processing component, and a DPU.

FIG. 10 is a communication flow diagram 1000 of display processing in accordance with one or more techniques of this disclosure. As shown in FIG. 10, diagram 1000 includes example communications between GPU 1002, display processing component 1004 (e.g., a component in a display processing operation), and DPU 1006 (or other display processor), in accordance with one or more techniques of this disclosure.

At 1010, GPU 1002 may receive a list of a plurality of concurrent frame buffers for a display processing operation (e.g., receive buffers 1012 from display processing component 1004). The list of the plurality of concurrent frame buffers may be received from at least one component associated with the display processing operation.

At 1020, GPU 1002 may configure a plurality of concurrent frame buffers for a display processing operation, where all of the plurality of concurrent frame buffers are associated with a same frame in a plurality of frames in a scene of the display processing operation. In some instances, configuring the plurality of concurrent frame buffers may include: selecting the plurality of concurrent frame buffers from the list of the plurality of concurrent frame buffers. Each of the plurality of concurrent frame buffers (e.g., frame buffers that cache or store information concurrently) may be associated with one of a plurality of color formats or a plurality of color coordinates. The plurality of color formats may include at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and the plurality of color coordinates may include one or more XYZ color coordinates. Additionally, the plurality of concurrent frame buffers may be dynamically configured during a run-time of an operating system (OS) associated with the display processing operation. Moreover, configuring the plurality of concurrent frame buffers for the display processing operation may include: generating the plurality of concurrent frame buffers for the display processing operation at a graphics processing unit (GPU). Further, the plurality of concurrent frame buffers may correspond to a plurality of frame buffer targets (FBTs) or a plurality of concurrent FBTs.

At 1030, GPU 1002 may obtain a set of display layers associated with the plurality of frames in the scene of the display processing operation. In some aspects, obtaining the set of display layers associated with the plurality of frames may include: receiving the set of display layers associated with the plurality of frames from at least one rendering component associated with the display processing operation.

At 1040, GPU 1002 may identify a composition mapping scheme based on the plurality of concurrent frame buffers and the set of display layers. The composition mapping scheme may be a frame buffer target (FBT) composition mapping scheme. Also, identifying the composition mapping scheme may include: negotiating the composition mapping scheme with at least one component in an operating system (OS) associated with the display processing operation. Further, negotiating the composition mapping scheme with the at least one component in the OS may include: transmitting one or more layer lists to the at least one component in the OS, where the composition mapping scheme is negotiated based on the one or more layer lists. Moreover, the composition mapping scheme may map at least two display layers in the set of display layers to a first concurrent frame buffer in the plurality of concurrent frame buffers.

At 1050, GPU 1002 may perform a composition of one or more display layers in the set of display layers based on the composition mapping scheme.

At 1060, GPU 1002 may transmit, based on the composition of the one or more display layers, data associated with one or more of: at least one display layer in the set of display layers or at least one concurrent frame buffer in the plurality of concurrent frame buffers (e.g., transmit data 1062 to DPU 1006). The at least one display layer may not be included in the one or more display layers. Also, the at least one concurrent frame buffer may include all of the plurality of concurrent frame buffers.

FIG. 11 is a flowchart 1100 of an example method of display processing in accordance with one or more techniques of this disclosure. The method may be performed by a GPU (or other graphics processor), a CPU (or other central processor), a DPU (or other display processor), a DDIC, an apparatus for display processing, a wireless communication device, and/or any apparatus that may perform display processing as used in connection with the examples of FIGS. 1-10.

At 1104, the GPU may configure a plurality of concurrent frame buffers for a display processing operation, where all of the plurality of concurrent frame buffers are associated with a same frame in a plurality of frames in a scene of the display processing operation, as described in connection with the examples in FIGS. 1-10. For example, as described in 1020 of FIG. 10, GPU 1002 may configure a plurality of concurrent frame buffers for a display processing operation, where all of the plurality of concurrent frame buffers are associated with a same frame in a plurality of frames in a scene of the display processing operation. Further, step 1104 may be performed by processing unit 120 in FIG. 1. In some instances, configuring the plurality of concurrent frame buffers may include: selecting the plurality of concurrent frame buffers from the list of the plurality of concurrent frame buffers. Each of the plurality of concurrent frame buffers (e.g., frame buffers that cache or store information concurrently) may be associated with one of a plurality of color formats or a plurality of color coordinates. The plurality of color formats may include at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and the plurality of color coordinates may include one or more XYZ color coordinates. Additionally, the plurality of concurrent frame buffers may be dynamically configured during a run-time of an operating system (OS) associated with the display processing operation. Moreover, configuring the plurality of concurrent frame buffers for the display processing operation may include: generating the plurality of concurrent frame buffers for the display processing operation at a graphics processing unit (GPU). Further, the plurality of concurrent frame buffers may correspond to a plurality of frame buffer targets (FBTs) or a plurality of concurrent FBTs.

At 1106, the GPU may obtain a set of display layers associated with the plurality of frames in the scene of the display processing operation, as described in connection with the examples in FIGS. 1-10. For example, as described in 1030 of FIG. 10, GPU 1002 may obtain a set of display layers associated with the plurality of frames in the scene of the display processing operation. Further, step 1106 may be performed by processing unit 120 in FIG. 1. In some aspects, obtaining the set of display layers associated with the plurality of frames may include: receiving the set of display layers associated with the plurality of frames from at least one rendering component associated with the display processing operation.

At 1108, the GPU may identify a composition mapping scheme based on the plurality of concurrent frame buffers and the set of display layers, as described in connection with the examples in FIGS. 1-10. For example, as described in 1040 of FIG. 10, GPU 1002 may identify a composition mapping scheme based on the plurality of concurrent frame buffers and the set of display layers. Further, step 1108 may be performed by processing unit 120 in FIG. 1. The composition mapping scheme may be a frame buffer target (FBT) composition mapping scheme. Also, identifying the composition mapping scheme may include: negotiating the composition mapping scheme with at least one component in an operating system (OS) associated with the display processing operation. Further, negotiating the composition mapping scheme with the at least one component in the OS may include: transmitting one or more layer lists to the at least one component in the OS, where the composition mapping scheme is negotiated based on the one or more layer lists. Moreover, the composition mapping scheme may map at least two display layers in the set of display layers to a first concurrent frame buffer in the plurality of concurrent frame buffers.

At 1110, the GPU may perform a composition of one or more display layers in the set of display layers based on the composition mapping scheme, as described in connection with the examples in FIGS. 1-10. For example, as described in 1050 of FIG. 10, GPU 1002 may perform a composition of one or more display layers in the set of display layers based on the composition mapping scheme. Further, step 1110 may be performed by processing unit 120 in FIG. 1.

FIG. 12 is a flowchart 1200 of an example method of display processing in accordance with one or more techniques of this disclosure. The method may be performed by a GPU (or other graphics processor), a CPU (or other central processor), a DPU (or other display processor), a DDIC, an apparatus for display processing, a wireless communication device, and/or any apparatus that may perform display processing as used in connection with the examples of FIGS. 1-10.

At 1202, the GPU may receive a list of a plurality of concurrent frame buffers for a display processing operation, as described in connection with the examples in FIGS. 1-10.

For example, as described in 1010 of FIG. 10, GPU 1002 may receive a list of a plurality of concurrent frame buffers for a display processing operation. Further, step 1202 may be performed by processing unit 120 in FIG. 1. The list of the plurality of concurrent frame buffers may be received from at least one component associated with the display processing operation.

At 1204, the GPU may configure a plurality of concurrent frame buffers for a display processing operation, where all of the plurality of concurrent frame buffers are associated with a same frame in a plurality of frames in a scene of the display processing operation, as described in connection with the examples in FIGS. 1-10. For example, as described in 1020 of FIG. 10, GPU 1002 may configure a plurality of concurrent frame buffers for a display processing operation, where all of the plurality of concurrent frame buffers are associated with a same frame in a plurality of frames in a scene of the display processing operation. Further, step 1204 may be performed by processing unit 120 in FIG. 1. In some instances, configuring the plurality of concurrent frame buffers may include: selecting the plurality of concurrent frame buffers from the list of the plurality of concurrent frame buffers. Each of the plurality of concurrent frame buffers (e.g., frame buffers that cache or store information concurrently) may be associated with one of a plurality of color formats or a plurality of color coordinates. The plurality of color formats may include at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and the plurality of color coordinates may include one or more XYZ color coordinates. Additionally, the plurality of concurrent frame buffers may be dynamically configured during a run-time of an operating system (OS) associated with the display processing operation. Moreover, configuring the plurality of concurrent frame buffers for the display processing operation may include: generating the plurality of concurrent frame buffers for the display processing operation at a graphics processing unit (GPU). Further, the plurality of concurrent frame buffers may correspond to a plurality of frame buffer targets (FBTs) or a plurality of concurrent FBTs.

At 1206, the GPU may obtain a set of display layers associated with the plurality of frames in the scene of the display processing operation, as described in connection with the examples in FIGS. 1-10. For example, as described in 1030 of FIG. 10, GPU 1002 may obtain a set of display layers associated with the plurality of frames in the scene of the display processing operation. Further, step 1206 may be performed by processing unit 120 in FIG. 1. In some aspects, obtaining the set of display layers associated with the plurality of frames may include: receiving the set of display layers associated with the plurality of frames from at least one rendering component associated with the display processing operation.

At 1208, the GPU may identify a composition mapping scheme based on the plurality of concurrent frame buffers and the set of display layers, as described in connection with the examples in FIGS. 1-10. For example, as described in 1040 of FIG. 10, GPU 1002 may identify a composition mapping scheme based on the plurality of concurrent frame buffers and the set of display layers. Further, step 1208 may be performed by processing unit 120 in FIG. 1. The composition mapping scheme may be a frame buffer target (FBT) composition mapping scheme. Also, identifying the composition mapping scheme may include: negotiating the composition mapping scheme with at least one component in an operating system (OS) associated with the display processing operation. Further, negotiating the composition mapping scheme with the at least one component in the OS may include: transmitting one or more layer lists to the at least one component in the OS, where the composition mapping scheme is negotiated based on the one or more layer lists. Moreover, the composition mapping scheme may map at least two display layers in the set of display layers to a first concurrent frame buffer in the plurality of concurrent frame buffers.

At 1210, the GPU may perform a composition of one or more display layers in the set of display layers based on the composition mapping scheme, as described in connection with the examples in FIGS. 1-10. For example, as described in 1050 of FIG. 10, GPU 1002 may perform a composition of one or more display layers in the set of display layers based on the composition mapping scheme. Further, step 1210 may be performed by processing unit 120 in FIG. 1.

At 1212, the GPU may transmit, based on the composition of the one or more display layers, data associated with one or more of: at least one display layer in the set of display layers or at least one concurrent frame buffer in the plurality of concurrent frame buffers, as described in connection with the examples in FIGS. 1-10. For example, as described in 1060 of FIG. 10, GPU 1002 may transmit, based on the composition of the one or more display layers, data associated with one or more of: at least one display layer in the set of display layers or at least one concurrent frame buffer in the plurality of concurrent frame buffers. Further, step 1212 may be performed by processing unit 120 in FIG. 1. The at least one display layer may not be included in the one or more display layers. Also, the at least one concurrent frame buffer may include all of the plurality of concurrent frame buffers.

In configurations, a method or an apparatus for display processing is provided. The apparatus may be a GPU (or other graphics processor), a CPU (or other central processor), a DPU (or other display processor), a DDIC, an apparatus for display processing, and/or some other processor that may perform display processing. In aspects, the apparatus may be the processing unit 120 within the device 104, or may be some other hardware within the device 104 or another device. The apparatus, e.g., processing unit 120, may include means for configuring a plurality of concurrent frame buffers for a display processing operation, where all of the plurality of concurrent frame buffers are associated with a same frame in a plurality of frames in a scene of the display processing operation. The apparatus, e.g., processing unit 120, may also include means for obtaining a set of display layers associated with the plurality of frames in the scene of the display processing operation. The apparatus, e.g., processing unit 120, may also include means for identifying a composition mapping scheme based on the plurality of concurrent frame buffers and the set of display layers. The apparatus, e.g., processing unit 120, may also include means for performing a composition of one or more display layers in the set of display layers based on the composition mapping scheme. The apparatus, e.g., processing unit 120, may also include means for transmitting, based on the composition of the one or more display layers, data associated with one or more of: at least one display layer in the set of display layers or at least one concurrent frame buffer in the plurality of concurrent frame buffers. The apparatus, e.g., processing unit 120, may also include means for receiving a list of the plurality of concurrent frame buffers for the display processing operation.

The subject matter described herein may be implemented to realize one or more benefits or advantages. For instance, the described display processing techniques may be used by a GPU, a CPU, a DPU, a display processor, or some other processor that may perform display processing to implement the concurrent frame buffer composition techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize concurrent frame buffer composition techniques in order to improve memory bandwidth efficiency and/or increase processing speed at a GPU or DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing, including a memory and at least one processor coupled to the memory and, based at least in part on information stored in the memory, the at least one processor is configured to: configure a plurality of concurrent frame buffers for a display processing operation, where all of the plurality of concurrent frame buffers are associated with a same frame in a plurality of frames in a scene of the display processing operation; obtain a set of display layers associated with the plurality of frames in the scene of the display processing operation; identify a composition mapping scheme based on the plurality of concurrent frame buffers and the set of display layers; and perform a composition of one or more display layers in the set of display layers based on the composition mapping scheme.

Aspect 2 is the apparatus of aspect 1, where the at least one processor is further configured to: transmit, based on the composition of the one or more display layers, data associated with one or more of: at least one display layer in the set of display layers or at least one concurrent frame buffer in the plurality of concurrent frame buffers.

Aspect 3 is the apparatus of any of aspects 1 and 2, where the at least one display layer is not included in the one or more display layers, and where the at least one concurrent frame buffer includes all of the plurality of concurrent frame buffers.

Aspect 4 is the apparatus of any of aspects 1 to 3, where the composition mapping scheme maps at least two display layers in the set of display layers to a first concurrent frame buffer in the plurality of concurrent frame buffers.

Aspect 5 is the apparatus of any of aspects 1 to 4, where the at least one processor is further configured to: receive a list of the plurality of concurrent frame buffers for the display processing operation, and where to configure the plurality of concurrent frame buffers, the at least one processor is configured to: select the plurality of concurrent frame buffers from the list of the plurality of concurrent frame buffers.

Aspect 6 is the apparatus of any of aspects 1 to 5, where the list of the plurality of concurrent frame buffers is received from at least one component associated with the display processing operation.

Aspect 7 is the apparatus of any of aspects 1 to 6, where the composition mapping scheme is a frame buffer target (FBT) composition mapping scheme.

Aspect 8 is the apparatus of any of aspects 1 to 7, where to identify the composition mapping scheme, the at least one processor is configured to: negotiate the composition mapping scheme with at least one component in an operating system (OS) associated with the display processing operation.

Aspect 9 is the apparatus of any of aspects 1 to 8, where to negotiate the composition mapping scheme with the at least one component in the OS, the at least one processor is configured to: transmit one or more layer lists to the at least one component in the OS, where the composition mapping scheme is negotiated based on the one or more layer lists.

Aspect 10 is the apparatus of any of aspects 1 to 9, where each of the plurality of concurrent frame buffers is associated with one of a plurality of color formats or a plurality of color coordinates.

Aspect 11 is the apparatus of any of aspects 1 to 10, where the plurality of color formats includes at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and where the plurality of color coordinates includes one or more XYZ color coordinates.

Aspect 12 is the apparatus of any of aspects 1 to 11, where to obtain the set of display layers associated with the plurality of frames, the at least one processor is configured to: receive the set of display layers associated with the plurality of frames from at least one rendering component associated with the display processing operation.

Aspect 13 is the apparatus of any of aspects 1 to 12, where the plurality of concurrent frame buffers is dynamically configured during a run-time of an operating system (OS) associated with the display processing operation.

Aspect 14 is the apparatus of any of aspects 1 to 13, where to configure the plurality of concurrent frame buffers for the display processing operation, the at least one processor is configured to: generate the plurality of concurrent frame buffers for the display processing operation at a graphics processing unit (GPU).

Aspect 15 is the apparatus of any of aspects 1 to 14, where the plurality of concurrent frame buffers corresponds to a plurality of concurrent frame buffer targets (FBTs).

Aspect 16 is the apparatus of any of aspects 1 to 15, where the apparatus is a wireless communication device, further including at least one of an antenna or a transceiver coupled to the at least one processor.

Aspect 17 is a method of display processing for implementing any of aspects 1 to 16.

Aspect 18 is an apparatus for display processing including means for implementing any of aspects 1 to 16.

Aspect 19 is a computer-readable medium (e.g., a non-transitory computer-readable medium) storing computer executable code, the code when executed by at least one processor causes the at least one processor to implement any of aspects 1 to 16.

What is claimed is:

1. An apparatus for display processing, comprising:
memory; and
at least one processor coupled to the memory and, based at least in part on information stored in the memory, the at least one processor is configured to:
configure a plurality of concurrent frame buffers for a display processing operation, wherein all of the plurality of concurrent frame buffers are associated with a same frame in a plurality of frames in a scene of the display processing operation;

obtain a set of display layers associated with the plurality of frames in the scene of the display processing operation;
identify a composition mapping scheme based on the plurality of concurrent frame buffers and the set of display layers;
perform a composition of one or more display layers in the set of display layers based on the composition mapping scheme; and
transmit, based on the composition of the one or more display layers, data associated with one or more of: at least one display layer in the set of display layers or at least one concurrent frame buffer in the plurality of concurrent frame buffers.

2. The apparatus of claim 1, wherein the at least one display layer is not included in the one or more display layers, and wherein the at least one concurrent frame buffer includes all of the plurality of concurrent frame buffers.

3. The apparatus of claim 1, wherein the composition mapping scheme maps at least two display layers in the set of display layers to a first concurrent frame buffer in the plurality of concurrent frame buffers.

4. The apparatus of claim 1, wherein the at least one processor is further configured to:
receive a list of the plurality of concurrent frame buffers for the display processing operation, and wherein to configure the plurality of concurrent frame buffers, the at least one processor is configured to: select the plurality of concurrent frame buffers from the list of the plurality of concurrent frame buffers.

5. The apparatus of claim 4, wherein the list of the plurality of concurrent frame buffers is received from at least one component associated with the display processing operation.

6. The apparatus of claim 1, wherein the composition mapping scheme is a frame buffer target (FBT) composition mapping scheme.

7. The apparatus of claim 1, wherein to identify the composition mapping scheme, the at least one processor is configured to: negotiate the composition mapping scheme with at least one component in an operating system (OS) associated with the display processing operation.

8. The apparatus of claim 7, wherein to negotiate the composition mapping scheme with the at least one component in the OS, the at least one processor is configured to: transmit one or more layer lists to the at least one component in the OS, wherein the composition mapping scheme is negotiated based on the one or more layer lists.

9. The apparatus of claim 1, wherein each of the plurality of concurrent frame buffers is associated with one of a plurality of color formats or a plurality of color coordinates.

10. The apparatus of claim 9, wherein the plurality of color formats includes at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and wherein the plurality of color coordinates includes one or more XYZ color coordinates.

11. The apparatus of claim 1, wherein to obtain the set of display layers associated with the plurality of frames, the at least one processor is configured to: receive the set of display layers associated with the plurality of frames from at least one rendering component associated with the display processing operation.

12. The apparatus of claim 1, wherein the plurality of concurrent frame buffers is dynamically configured during a run-time of an operating system (OS) associated with the display processing operation.

13. The apparatus of claim 1, wherein to configure the plurality of concurrent frame buffers for the display processing operation, the at least one processor is configured to: generate the plurality of concurrent frame buffers for the display processing operation at a graphics processing unit (GPU).

14. The apparatus of claim 1, further comprising at least one of an antenna or a transceiver coupled to the at least one processor, and wherein the plurality of concurrent frame buffers corresponds to a plurality of concurrent frame buffer targets (FBTs).

15. A method of display processing, comprising:
configuring a plurality of concurrent frame buffers for a display processing operation, wherein all of the plurality of concurrent frame buffers are associated with a same frame in a plurality of frames in a scene of the display processing operation;
obtaining a set of display layers associated with the plurality of frames in the scene of the display processing operation;
identifying a composition mapping scheme based on the plurality of concurrent frame buffers and the set of display layers;
performing a composition of one or more display layers in the set of display layers based on the composition mapping scheme; and
transmitting, based on the composition of the one or more display layers, data associated with one or more of: at least one display layer in the set of display layers or at least one concurrent frame buffer in the plurality of concurrent frame buffers.

16. The method of claim 15, wherein the at least one display layer is not included in the one or more display layers, and wherein the at least one concurrent frame buffer includes all of the plurality of concurrent frame buffers.

17. The method of claim 15, wherein the composition mapping scheme maps at least two display layers in the set of display layers to a first concurrent frame buffer in the plurality of concurrent frame buffers.

18. The method of claim 15, further comprising:
receiving a list of the plurality of concurrent frame buffers for the display processing operation, and wherein configuring the plurality of concurrent frame buffers comprises: selecting the plurality of concurrent frame buffers from the list of the plurality of concurrent frame buffers.

19. The method of claim 18, wherein the list of the plurality of concurrent frame buffers is received from at least one component associated with the display processing operation.

20. The method of claim 15, wherein the composition mapping scheme is a frame buffer target (FBT) composition mapping scheme.

21. The method of claim 15, wherein identifying the composition mapping scheme comprises: negotiating the composition mapping scheme with at least one component in an operating system (OS) associated with the display processing operation.

22. The method of claim 21, wherein negotiating the composition mapping scheme with the at least one component in the OS comprises: transmitting one or more layer lists to the at least one component in the OS, wherein the composition mapping scheme is negotiated based on the one or more layer lists.

23. The method of claim 15, wherein each of the plurality of concurrent frame buffers is associated with one of a plurality of color formats or a plurality of color coordinates.

24. The method of claim 23, wherein the plurality of color formats includes at least one of: a red (R), green (G), blue (B), alpha (A) (RGBA) color format, an RGBA8888 color format, an RGBA12121212 color format, an RGBA16161616 color format, a high dynamic range (HDR) color format, an RGB color format, or a luminance (Y) chrominance (UV) (YUV) color format, and wherein the plurality of color coordinates includes one or more XYZ color coordinates.

25. The method of claim 15, wherein obtaining the set of display layers associated with the plurality of frames comprises: receiving the set of display layers associated with the plurality of frames from at least one rendering component associated with the display processing operation, and wherein the plurality of concurrent frame buffers is dynamically configured during a run-time of an operating system (OS) associated with the display processing operation.

26. The method of claim 15, wherein configuring the plurality of concurrent frame buffers for the display processing operation comprises generating the plurality of concurrent frame buffers for the display processing operation at a graphics processing unit (GPU), and wherein the plurality of concurrent frame buffers corresponds to a plurality of concurrent frame buffer targets (FBTs).

27. An apparatus for display processing, comprising:
means for configuring a plurality of concurrent frame buffers for a display processing operation, wherein all of the plurality of concurrent frame buffers are associated with a same frame in a plurality of frames in a scene of the display processing operation;
means for obtaining a set of display layers associated with the plurality of frames in the scene of the display processing operation;
means for identifying a composition mapping scheme based on the plurality of concurrent frame buffers and the set of display layers;
means for performing a composition of one or more display layers in the set of display layers based on the composition mapping scheme; and
means for transmitting, based on the composition of the one or more display layers, data associated with one or more of: at least one display layer in the set of display layers or at least one concurrent frame buffer in the plurality of concurrent frame buffers.

28. A computer-readable medium storing computer executable code for display processing, the code when executed by a processor causes the processor to:
configure a plurality of concurrent frame buffers for a display processing operation, wherein all of the plurality of concurrent frame buffers are associated with a same frame in a plurality of frames in a scene of the display processing operation;
obtain a set of display layers associated with the plurality of frames in the scene of the display processing operation;
identify a composition mapping scheme based on the plurality of concurrent frame buffers and the set of display layers;
perform a composition of one or more display layers in the set of display layers based on the composition mapping scheme; and transmit, based on the composition of the one or more display layers, data associated with one or more of: at least one display layer in the set of display layers or at least one concurrent frame buffer in the plurality of concurrent frame buffers.

\* \* \* \* \*